United States Patent [19]
White et al.

[11] Patent Number: 5,347,554
[45] Date of Patent: Sep. 13, 1994

[54] OUTER FILTER REMOVAL TOOL

[75] Inventors: Thomas W. White, San Jose; Edward J. Pulpan, San Ramon; Robert S. Tsukida, San Jose; Edward W. Saxon, San Jose; Frank Ortega, San Jose, all of Calif.

[73] Assignee: General Electric Company, San Jose, Calif.

[21] Appl. No.: 135,872

[22] Filed: Oct. 12, 1993

[51] Int. Cl.$^5$ ............................................. G21C 19/00
[52] U.S. Cl. .................................. 376/260; 376/313; 210/237; 414/146
[58] Field of Search ...................... 376/260, 313, 314; 414/146; 210/232, 237, 470, 471

[56] References Cited

U.S. PATENT DOCUMENTS

| | | | |
|---|---|---|---|
| 3,838,289 | 9/1974 | White | 376/260 |
| 4,572,710 | 2/1986 | Stock et al. | 376/260 |
| 5,017,330 | 5/1991 | Hurdiel | 376/260 |

OTHER PUBLICATIONS

GE Manual, "Control Rod Drive-Model 7RDB144B", pp. 3-5, May 1971.

*Primary Examiner*—Daniel D. Wasil
*Attorney, Agent, or Firm*—J. S. Beulick

[57] ABSTRACT

An improved tool for removing a highly contaminated outer filter from a control rod drive during a maintenance operation. The tool slides onto the control rod drive and surrounds the outer filter with a shield. The shield has a window for removing the screws used to mount the outer filter on the control rod drive. The tool has a support for the spud on the inside thereof. A U-shaped handle is slidably inserted into guideways so that it interlocks with circumferential slots in the shield. The arms of the inserted U-handle latch underneath the ring flange of the outer filter, whereby the outer filter is captured by the tool. The filter-mounting screws are then removed by unscrewing through the aligned window in the shield. Thereafter, the outer filter is removed from the CRD when the outer filter removal tool is lifted.

20 Claims, 5 Drawing Sheets

OUTER FILTER REMOVAL TOOL

FIELD OF THE INVENTION

This invention relates generally to maintenance of a control rod drive of a boiling water reactor. Specifically, the invention relates to tools for dismantling or assembling a CRD during a maintenance operation.

BACKGROUND OF THE INVENTION

Control rod drives (CRDs) are used to position control rods in boiling water reactors (BWRs) to control the fission rate and fission density, and to provide adequate excess negative reactivity to shutdown the reactor from any normal operating or accident condition at the most reactive time in core life. Referring to FIG. 1, each CRD is mounted vertically in a CRD housing 10 which is welded to a stub tube 8, which in turn is welded to the bottom head of the reactor pressure vessel 4. The CRD flange 6 is bolted and sealed to the flange 10a of the CRD housing 10, which contains ports for attaching the CRD hydraulic system lines 80, 81. De-mineralized water supplied by the CRD hydraulic system serves as the hydraulic fluid for CRD operation.

As shown schematically in FIG. 1, the CRD is a double-acting, mechanically latched hydraulic cylinder. The CRD is capable of inserting or withdrawing a control rod (not shown) at a slow controlled rate for normal reactor operation and of providing rapid control rod insertion (scram) in the event of an emergency requiring rapid shutdown of the reactor. A locking mechanism in the CRD permits the control rod to be positioned at 6-inch (152.4-mm) increments of stroke and to be held in these latched positions until the CRD is actuated for movement to a new position. A spud 46 at the top of the index tube 26 (the moving element) engages and locks into a socket at the bottom of the control rod. Once coupled, the CRD and control rod form an integral unit which must be manually uncoupled by specific procedures before a CRD or control rod may be removed from the reactor.

When installed in the reactor, the CRD is wholly contained in housing 10. The CRD flange 6 contains an insert port 66, a withdraw port 70 and an integral two-way check valve (with a ball 20). For normal drive operation, drive water is supplied via an associated hydraulic control unit (HCU) to the insert port 66 for drive insertion and/or to withdraw port 70 for drive withdrawal. For rapid shutdown, reactor pressure is admitted to the two-way check valve from the annular space between the CRD and a thermal sleeve (not shown) through passages in the CRD flange, called scram vessel ports. The check valve directs reactor pressure or external hydraulic pressure to the underside of drive piston 24.

Referring to FIGS. 2A and 2B, the CRD further comprises an inner cylinder 57 and an outer tube 56, which form an annulus through which water is applied to a collet piston 29b to unlock index tube 26. The internal diameter of inner cylinder 57 is honed to provide the surface required for expanding seals 65 on the drive piston 24. A collet housing 51 (which is part of outer tube 56) is provided with ports 73 to permit free passage of water from the clearance space between the outer diameter of index tube 26 and the inner diameter of inner cylinder 57 and the inner diameter of collet housing 51. The bottom of collet piston 29b normally rests against a spacer 52 in the upper portion of the annular space. Grooves in the spacer permit the passage of water between the bottom of the collet piston 29b and the passage area within the cylinder, tube and flange.

Welded pipes 80 and 81, installed in the CRD housing, port water to the insert port 66 and the withdraw port 70 respectively. A port 69 below outer tube 56 connects to withdraw port 70 in CRD flange 6 so that water is applied through the annulus to collet piston 29b when a withdraw signal is given.

The CRD is secured to the CRD housing flange 10a by eight mounting bolts (not shown). A pressure-tight seal is effected between the mated flanges by O-ring gaskets (not shown) mounted in a spacer 7 secured to the CRD flange face.

Insert port 66 contains a ball check valve which consists of check-valve ball 20, ball retainer 21, and retainer O-ring 22. This valve directs HCU accumulator pressure or reactor pressure to the underside of drive piston 24 during scram operation. Port 66 is connected internally to the annulus and the bottom of drive piston 24 and serves as the inlet for water during normal insertion or scram. Water enters this port for a brief period in response to a withdraw signal to move the index tube 26 upward so that collet fingers 29a are cammed out. Following this brief unlocking period, water from below drive piston 24 is discharged through port 66 and through the under-piston hydraulic line for the duration of the withdraw signal. During the time the CRD remains stationary, cooling water passes through an annulus internal to flange 6 to the area between outer tube 56 and the inside of the thermal sleeve to cool the CRD.

The withdraw port 70 serves as the inlet port for water during control rod withdrawal and as the outlet port for water during normal or scram insertion. It connects with internal porting and annuli to the area above drive piston 24. During a withdraw operation, water is supplied from port 70 through a small connecting port in CRD flange 6 to the annular space between outer tube 56 and inner cylinder 57 for application to the bottom of collet piston 29b.

The locking mechanism consists of collet fingers 29a, collet piston 29b, barrel 35, guide cap 39, and collet spring 31. The mechanism is contained in the collet housing 51 portion of outer tube 56 and is the means by which index tube 26 is locked to hold the control rod at a selected position.

The collet assembly consists of a collet piston 29b fitted with four piston seal rings, two outer 28 and two inner 27, six fingers 29a and a retainer (not shown) and is set into a bore in the collet housing 51. In addition, a spring 31, barrel 35 and guide cap 39 complete the components installed in the collet housing 51.

Guide cap 39 is held in place above the collet by three plugs 37 which penetrate the upper end of collet housing 51, and which are held in place by fillister-head screws. It provides a fixed camming surface to guide collet fingers 29a upward and away from index tube 26 when unlocking pressure is applied to collet piston 29b. Barrel 35 is installed below guide cap 39 and serves as fixed seat for collet spring 31.

The collet mechanism requires a hydraulic pressure greater than reactor pressure to unlock for CRD-withdraw movement. A preload is placed on collet spring 31 at assembly and must be overcome before the collet can be moved toward the unlocked position. For control rod withdrawal, a brief insert signal is applied to move index tube 26 upward to relieve the axial load on collet fingers 29a, camming them outward against the sloping lower surface of index tube locking notch 55. Immediately thereafter, withdraw pressure is applied. In addition to moving index tube 26 downward, this pressure is at the same time applied to the bottom of collet piston 29b to overcome the spring pressure and cam the fingers 29a outward against guide cap 39. When the withdraw signal ceases, the spring pressure forces the collet downward so that fingers 29a slip off guide cap 39. As index tube 26 settles downward, collet fingers 29a snap into the next higher notch and lock. When collet fingers 29a engage a locking notch 55, collet piston 29b transfers the control rod weight from index tube 26 to the outer tube 56.

Unlocking is not required for CRD insertion. The collet fingers are cammed out of the locking notch as index tube 26 moves upward. The fingers 29a grip the outside wall of index tube 26 and snap into the next lower locking notch for single-notch insertion to hold index tube 26 in position. For scram insertion, index tube 26 moves continuously to its limit of travel during which the fingers snap into and cam out of each locking notch as index tube 26 moves upward. When the insert, withdraw or scram pressures are removed, index tube 26 settles back, from the limit of travel, and locks to hold the control rod in the required position.

The drive piston 24 and index tube 26 are the primary subassembly in the CRD, providing the driving link with the control rod as well as the notches for the locking mechanism collet fingers. Drive piston 24 operates between positive end stops, with a hydraulic cushion provided at the upper end only. Index tube 26 is a nitrided stainless-steel tube threaded internally at both ends. The spud 46 is threaded to its upper end, while the head of the drive piston 24 is threaded to its lower end. Both connections are secured in place by means of bands 25, 25' with tab locks.

There are 25 notches machined into the wall of index tube 26, all but one of which are locking notches 55 spaced at 6-inch intervals. The uppermost surfaces of these notches engage collet fingers 29b, providing 24 increments at which a control rod may be positioned and preventing inadvertent withdrawal of the rod from the core. The lower surfaces of the locking notches slope gradually so that the collet fingers cam outward for control rod insertion.

Drive piston 24 is provided with internal (62, 71, 72) and external seal rings (65), and is operated in the annular space between piston tube 15 and inner cylinder 57. Internal (63) and external (64) bushings prevent metal-to-metal contact between drive piston 24 and the surface of piston tube 15 and the wall of inner cylinder 57 respectively.

When a control rod is driven upward to its fully inserted position during normal operation or scram, the upper end of the piston head contacts the spring washers 30 which are installed below the stop piston 33. Washers 30 and stop piston 33 provide the upper limit of travel for drive piston 24. The spring washers, together with the series of buffer orifices 53 in the upper portion of piston tube 15, effectively cushion the moving drive piston 24 and reduce the shock of impact when the piston head contacts the stop piston.

The magnet housing, which comprises the lower end of drive piston 24, contains a ring magnet 67 which actuates the switches of the position indicator probe (not shown) to provide remote electrical signals indicating control rod position.

The piston tube assembly forms the innermost cylindrical wall of the CRD. It is a welded unit consisting of piston tube 15 and a position indicator tube 61. The piston tube assembly provides three basic functions for CRD operation: (a) position indicator tube 61 is a pressure-containing part which forms a drywell housing for a position indicator probe 12a (see FIG. 2A); (b) piston tube 15 provides for the porting of water to or from the upper end of the piston head portion of drive piston 24 during rod movement; and (c) during control rod scram insertion, buffer orifices 53 in piston tube 15 progressively shut off water flow to provide gradual deceleration of drive piston 24 and index tube 26.

A stud 59 is welded to the upper end of tube piston 15. Stud 59 is threaded for mounting the stop piston 33. A shoulder on the stud, just below the threaded section, is machined to provide a recess for the spring washers 30 that cushion the upward movement of drive piston 24.

The tube section 15a and head section 15b of piston tube 15 provide space for position indicator tube 61, which is welded to the inner diameter of the threaded end of head section 15b and extends upward through the length of tube section 15a, terminating in a watertight cap near the upper end of the tube section. Piston tube 15 is secured by a nut 16 at the lower end of the CRD. Two horizontal ports are provided in the head section 15b, 180° apart, to transmit water between the withdraw porting in the CRD flange and the annulus between indicator tube 61 and tube section 15a of piston tube 15 for application to the top of drive piston 24. Three O-ring seals 18 are installed around head section 15b. Two seal the bottom of the CRD against water leakage and one seals the drive piston 24 under-piston pressure from the drive piston over-piston pressure.

The position indicator probe 12a, which is slidably inserted into indicator tube 61, transmits electrical signals to provide remote indications of control rod position and CRD operating temperature. Probe 12a is welded to a plate 12b, which plate is in turn bolted to housing 12. Housing 12 is secured to the CRD ring flange 17 by screws 13. A cable clamp 8, located at the bottom of a plug 14, secures a connecting electrical cable (not shown) to plug 14. Ring flange 17 is in turn secured to the CRD housing by screws 9. Thus, probe 12a, housing 12 and cable clamp 11 (with the cables passing therethrough) can be removed as a unit.

The stop piston 33 threads onto the stud 59 at the upper end of piston tube 15. This piston provides the seal between reactor pressure and the area above the drive piston. It also functions as a positive-end stop at the upper limit of drive piston travel. Six spring washers 30 below the stop piston help absorb the final mechanical shock at the end of travel. Seals 34 include an upper pair used to maintain pressure above the drive piston during CRD withdrawal and a lower pair used only during the cushioning of the drive piston at the upper end of the stroke. Two external bushings 32 prevent metal-to-metal contact between stop piston 33 and index tube 26.

As seen in FIG. 2B, spud 46, which connects the control rod and CRD, is threaded onto the upper end of index tube 26 and held in place by locking band 44. Six spring fingers permit the spud to enter the mating socket on the control rod. A lock plug (not shown) then enters the spud from the socket and prevents uncoupling. The control rod can be uncoupled by lifting the lock plug by raising an uncoupling rod consisting of rod 48 and tube 43.

An outer filter 45 and the inner filter 41 are installed near the upper end of the CRD. Both are provided to filter reactor water flowing into the CRD, removing foreign particles or abrasive matter that could result in internal damage and excessive wear.

The outer filter assembly 45 consists of a ring with a flange on its outer periphery, a perforated cylinder for supporting a woven wire filter cloth, and a guide welded together. The outer filter is installed on the CRD by three lock-wired screws 40 which secure the lower end of outer filter 45 to guide cap 39. Outer filter 45 removes foreign particles from reactor water entering the annulus between the CRD outer tube and the thermal sleeve (not shown) in the reactor vessel CRD housing.

A strainer 36 consists of a perforated cylinder which encloses a coarse wire screen and is secured by three flat-head screws 5. Strainer 36 reduces the entry of coarse foreign particles from reactor water into the scram ports and ball-check valve in the CRD flange in the event such particles penetrate or bypass the outer filter 45.

The inner filter assembly 41 consists of a ring with a grooved flange on its outer periphery and an ungrooved flange on its inner periphery, a perforated cylinder for supporting a woven wire filter cloth, and a spring retainer assembly welded together. The inner filter prevents entry of particulate matter with reactor water entering the interior of the CRD through the coupling spud 46. A center lug 44 at the top of stop piston 33 is provided for mounting inner filter 41. The inner filter is held in place by a spring clip 42 which grips lug 44. The outside of the ring at the top of the filter cylinder is hard-surfaced to reduce wear from contact with the inside wall of index tube 26 and is sealed against water leakage by means of a seal ring 50 installed in the groove in the ring.

During maintenance of a CRD, the outer filter is removed. This filter has been exposed to fields of radiation during reactor operation. Historically, long-handled tongs have been used to handle the outer filter. The three filter-mounting screws are removed and then, using the long-handled tongs, the outer filter is slid from the end of the guide cap.

SUMMARY OF THE INVENTION

The present invention is an improved tool for removing the highly contaminated outer filter from the CRD during a maintenance operation. The tool is designed to slide over the spud end of the CRD and surround the outer filter with a shield during its removal. The shield has a window for removing the screws used to mount the outer filter on the control rod drive. The tool has a support for the spud on the inside thereof.

In accordance with the invention, a U-handle is slidably inserted into guideways so that it interlocks with circumferential slots in the shield. The arms of the inserted U-handle latch underneath the ring flange of the outer filter, whereby the outer filter is captured by the tool. The filter-mounting screws are then removed by unscrewing through the suitably aligned window in the shield. Thereafter, the outer filter is removed from the CRD when the outer filter removal tool is lifted.

The hardened handle and shield may be used as a ram to shear off a filter-mounting screw in the event that the screw head separates from the screw body. A wire rope is provided to tether the handle to the shield so that the handle will not be misplaced when withdrawn from the shield.

DETAILED DESCRIPTION OF THE PREFERRED EMBODIMENTS

Figure 1:
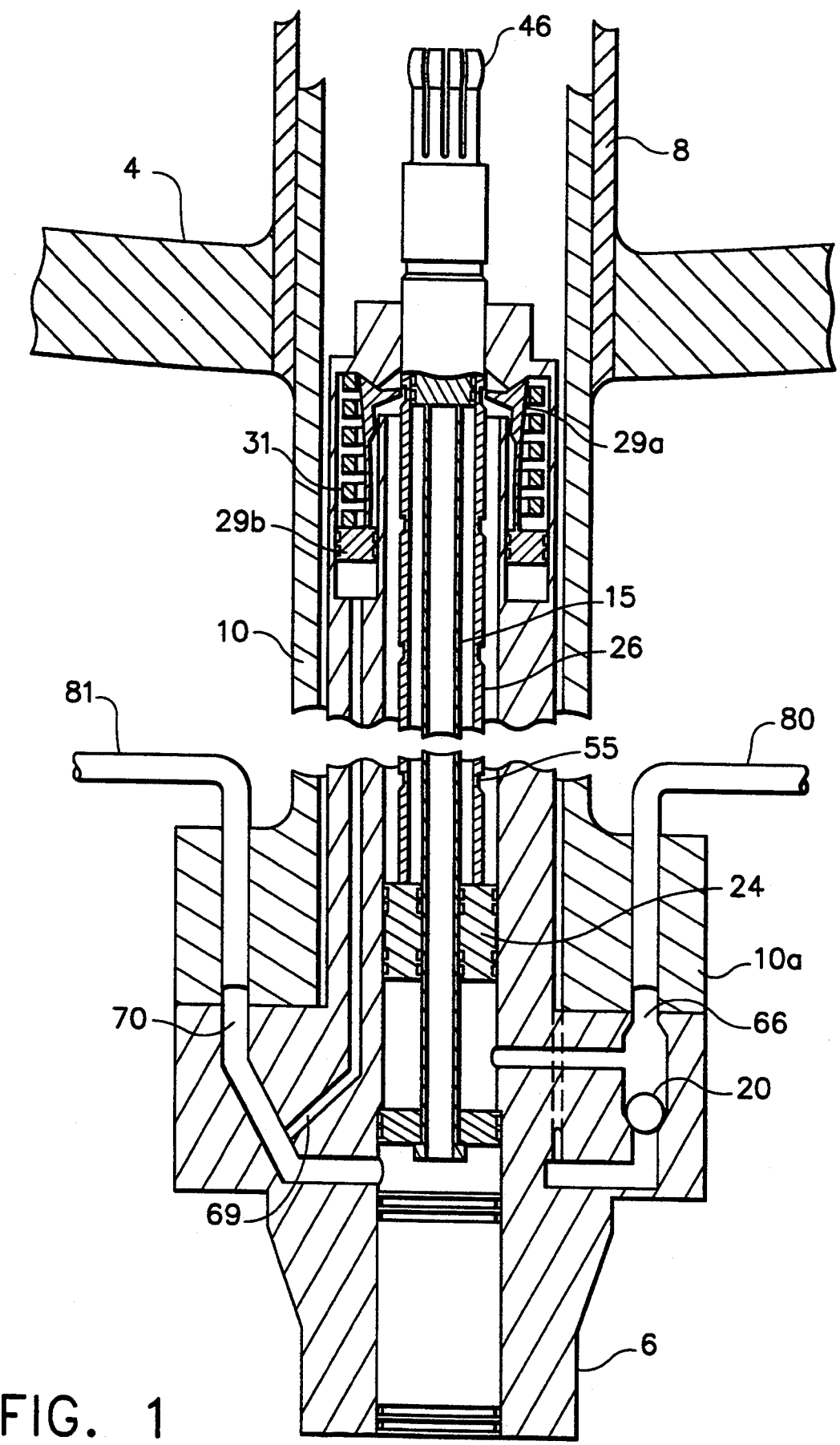
FIG. 1 is a sectional schematic of a conventional control rod drive installed in a BWR.
Figure 2A:
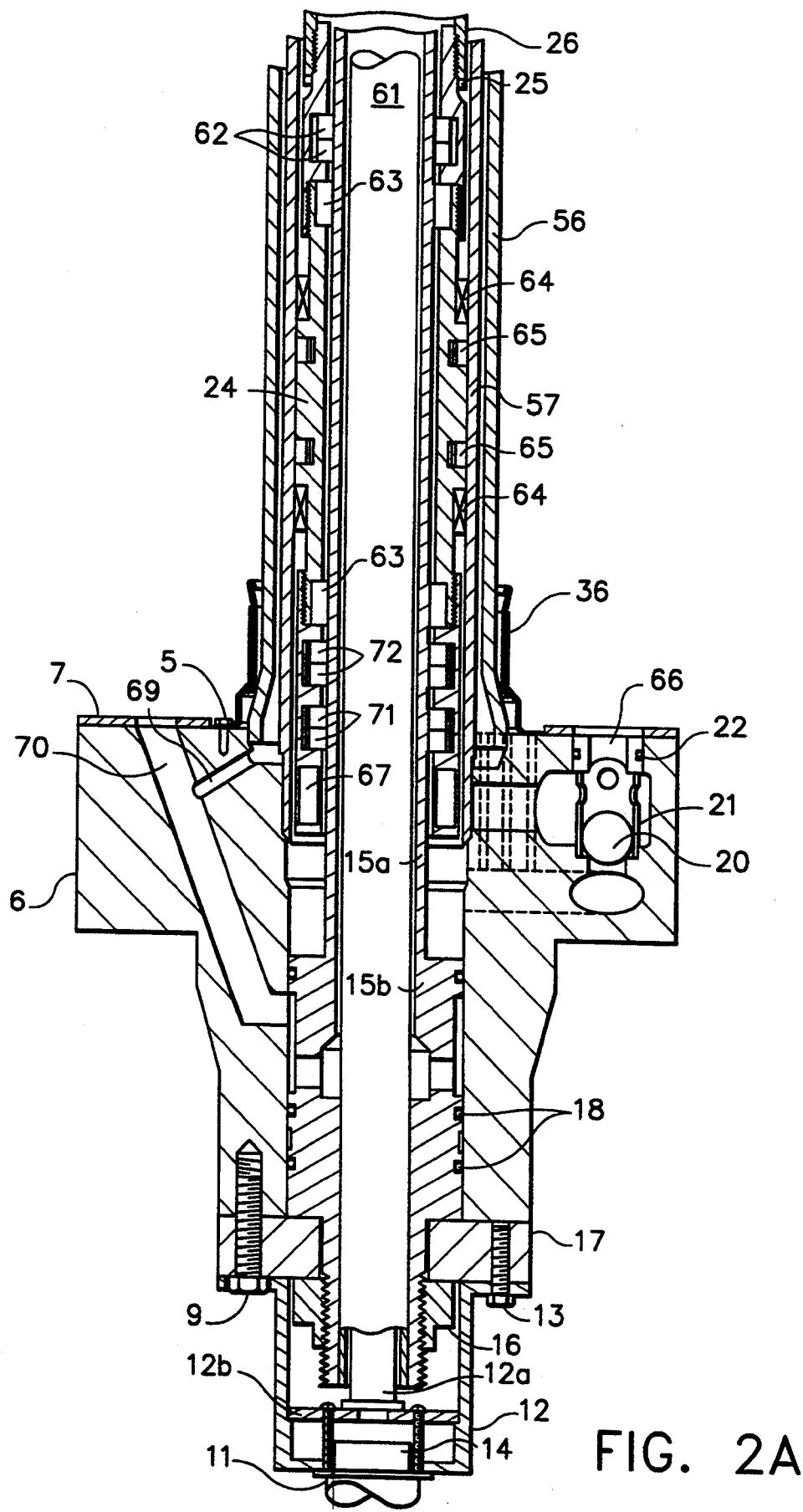
FIGS. 2A and 2B are sectional views of the lower and upper portions respectively of a conventional control rod drive.
Figure 2B:
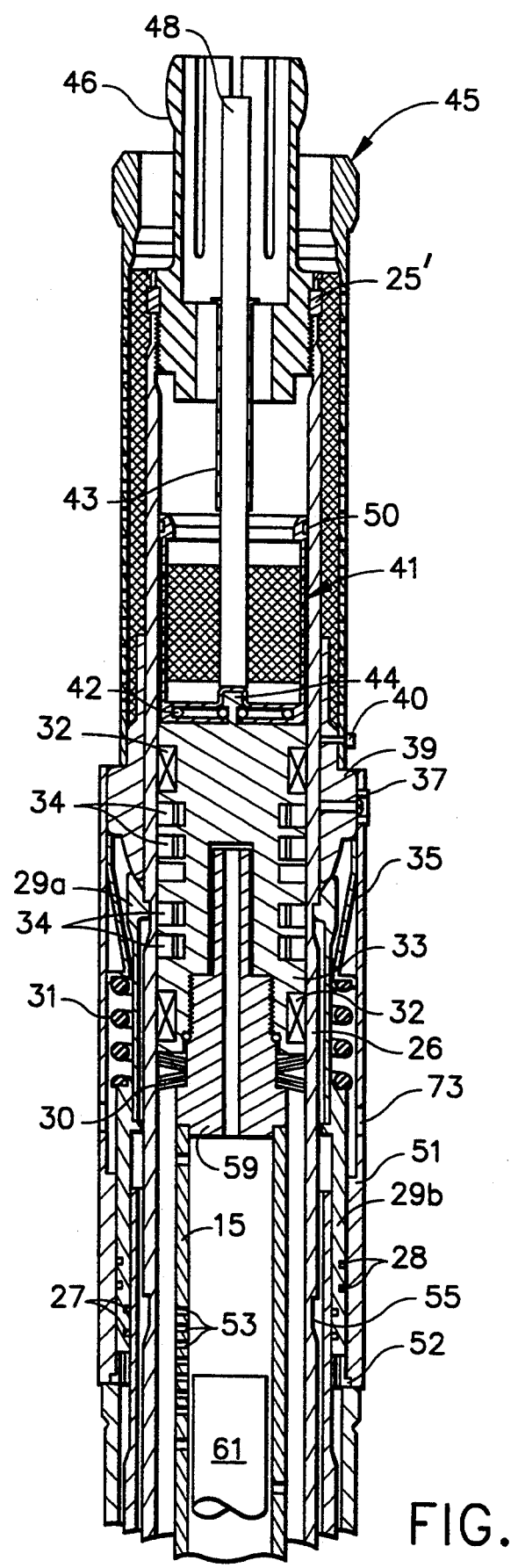
Figure 3:
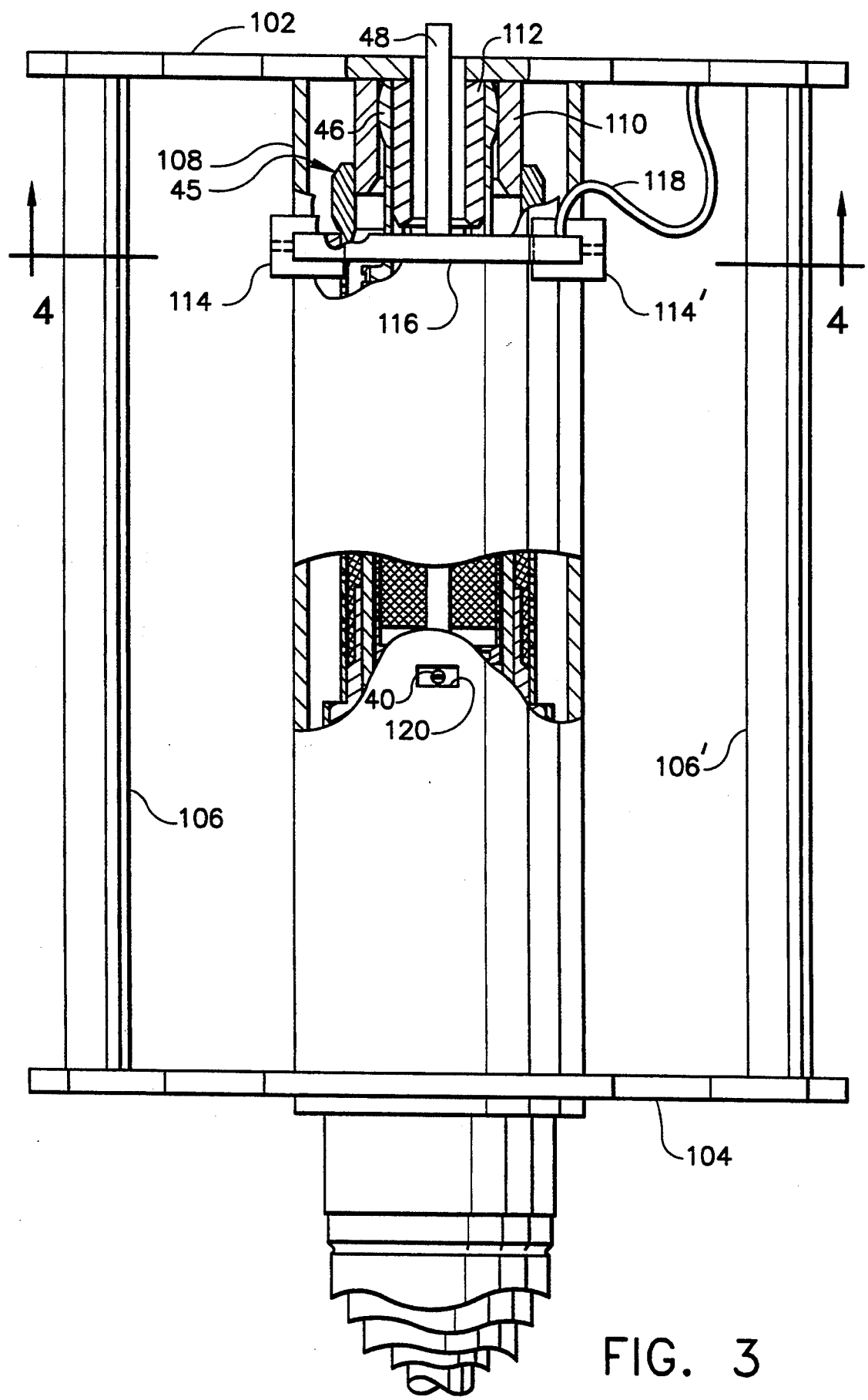
FIG. 3 is a partial sectional view of the outer filter removal tool in accordance with a preferred embodiment of the invention when mounted on a control rod drive.

In accordance with a preferred embodiment of the invention depicted in FIG. 3, the outer filter removal tool includes a welded assembly comprising a pair of opposing end plates 102, 104 held in parallel by a pair of tie rods 106, 106' and a cylindrical shield welded thereto. The tool can be lifted using the tie rods. End plate 102 further has a pair of concentric guide rings 110, 112 welded to bottom surface and extending downward. Guide ring 110 fits inside the ring flange of outer filter 45 and surrounds the fingers of spud 46. Guide ring 112 provides support for the spud on the inside.

The end plate 102 sits atop spud 46 when the outer filter removal tool is fully mounted on the CRD. In the mounted position, shield 108 circumferentially surrounds outer filter 45 along its entire length. To remove filter-mounting screws 40, the shield is rotated so that the window 120 is aligned with each of the three screws 40 in succession. The thickness of shield 108 is sufficient to block emissions from radioactive particulate matter trapped in the outer filter. Shield 108 is made of stainless steel, which can optionally be wrapped with lead.

Figure 4:
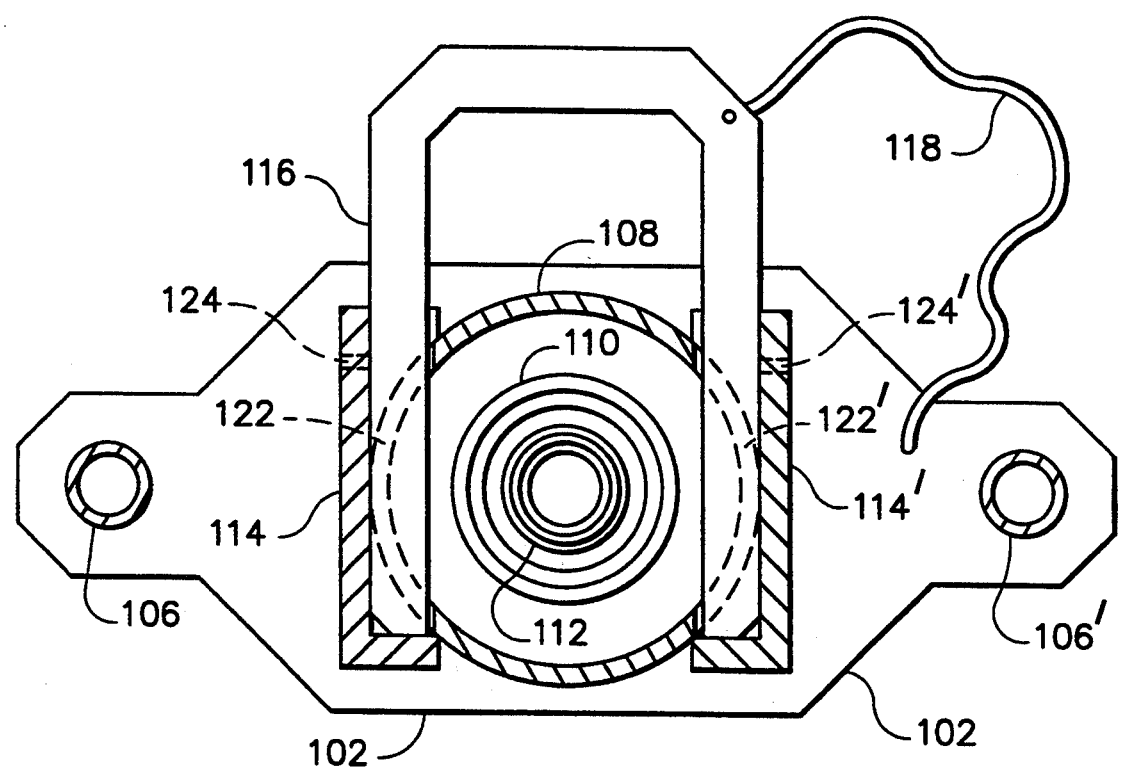
FIG. 4 is a sectional view of the outer filter removal tool taken along section line 4—4 as shown in FIG. 3, with the control rod drive removed.

A pair of opposing circumferential slots 122, 122' (see FIG. 4) are formed in cylindrical shield 108, which slots are covered by respective retainers 114, 114'. Each retainer conforms to the contour of cylindrical shield 108, having parallel contoured upper and lower walls welded to the external surface of the shield at locations immediately above and below slots 122. The upper and lower walls are connected by a side wall which, in conjunction with opposing surfaces at the ends of associated slot 122, form a guideway for receiving a respective cylindrical arm (preferably square or rectangular in cross section) of a U-handle 116. One end of each retainer is open for inserting the chamfered tip of the U-handle arm therein and the other end is closed to block further sliding of the U-handle in the insertion direction. Each retainer has a spring plunger 124, 124' which interlocks with an opposing recess formed in the side surface of a respective arm of U-handle 116 to hold the latter in the fully inserted position.

The U-handle 116 is inserted by sliding when the outer filter removal tool is mounted on the CRD as shown in FIG. 3. When fully inserted, the arms of U-handle 116 are seated in and interlocked with circumferential slots 122 of shield 108. In addition, the U-handle arms latch under the ring flange of outer filter 45 at diametrally opposed locations.

After insertion of U-handle 116 into the shield, each fillister-head screw 40 can be removed by first cutting the lock wire and then unscrewing the screw with a screwdriver through window 120. Removal of screws 40 detaches outer filter 45 from guide cap 39, freeing the outer filter for subsequent removal.

The coupled tool and outer filter can then be lifted off the CRD by maintenance personnel. Shield 108 provides dose reduction from radioactive particulate matter trapped in the outer filter. After removal from the CRD, outer filter 45 can be transferred to a suitable container for disposal or storage. The outer filter is released into the container by pulling out the U-handle. The U-handle is optionally tethered to the shield by a wire rope 118 to prevent misplacement of the U-handle when removed from the shield.

The foregoing preferred embodiment of the outer filter removal tool has been disclosed for the purpose of illustration. Variations and modifications of the disclosed structure will be readily apparent to mechanical engineers of ordinary skill in the art of tooling. All such variations and modifications are intended to be encompassed by the claims set forth hereinafter.

We claim:

1. A tool for removing an outer filter from a control rod drive after a control rod has been uncoupled therefrom, said outer filter having a radially outwardly projecting flange, comprising:
a cylindrical shield having a wall with diametrally opposed first and second circumferentially extending slots of similar shape formed at a predetermined distance from an end of said shield, said shield being sized such that said outer filter fits inside;
means for supporting said shield in a vertical position surrounding said outer filter with said first and second slots at an elevation slightly lower than the elevation of a lower boundary of said outer filter flange; and
means for coupling said surrounded outer filter to said shield, said coupling means having a fully inserted position whereat first and second portions thereof respectively protrude into said first and second slots; and
means for retaining said coupling means in said fully inserted position.

2. The tool as defined in claim 1, further comprising means for guiding said coupling means into said fully inserted position, said guiding means being joined to said shield and said retaining means being incorporated in said guiding means.

3. The tool as defined in claim 1, wherein said first and second portions of said fully inserted coupling means couple said surrounded outer filter to said shield by locking underneath said outer filter flange.

4. The tool as defined in claim 1, wherein said first and second portions of said coupling means respectively comprise mutually parallel first and second straight cylindrical legs separated by a distance which is less than the outer diameter of said outer filter flange, said coupling means further comprising rigid means for connecting said first and second legs.

5. The tool as defined in claim 4, further comprising first and second guideways for guiding said first and second legs to slide along a linear path from a pre-insertion position to said fully inserted position, said first and second guideways being respectively joined to said shield at positions whereat said first and second guideways respectively oppose said first and second slots.

6. The tool as defined in claim 5, wherein said retaining means comprise first and second spring plungers respectively incorporated in said first and second guideways, and said first and second legs of said coupling means have respective indentations placed so that said first and second spring plungers respectively reside therein when said coupling means is in said fully inserted position.

7. The tool as defined in claim 1, further comprising means for tethering said coupling means to said supporting means.

8. The tool as defined in claim 1, wherein said supporting means comprise an end plate and mutually concentric first and second guide rings extending from said end plate with an annular space therebetween for receiving a spud of said control rod drive, whereby said shield is supported by said spud in a position surrounding said outer filter.

9. The tool as defined in claim 1, wherein said outer filter is secured on said control rod drive by a plurality of mounting screws, and said shield has a window arranged to oppose a corresponding outer filter mounting screw when said tool is mounted on said control rod drive and properly aligned with said outer filter.

10. The tool as defined in claim 1, wherein said shield comprises a stainless steel tube wrapped with a high-density material for absorbing particles emitted from radioactive material in said outer filter.

11. The tool as defined in claim 10, wherein said high-density material is lead.

12. The tool as defined in claim 1, wherein said supporting means comprising first and second end plates connected by first and second tie rods and by said cylindrical shield, said first end plate having a hole for receiving an uncoupling rod of said control rod drive and said second end plate having a hole for facilitating passage of the top of said control rod drive inside said cylindrical shield.

13. A tool comprising:
a rigid support assembly;
a cylindrical tube made of metal or alloy and securely supported by said rigid support assembly, said tube having diametrally opposed first and second circumferentially extending slots; and
a U-shaped member having mutually parallel first and second cylindrical legs separated by a predetermined distance which is less than the inner diameter of said tube, said first and second legs intersecting said first and second slots respectively.

14. The tool as defined in claim 13, wherein said first and second slots each have first and second straight boundaries of equal length running in parallel to a longitudinal axis of said cylindrical tube and first and second arcuate boundaries lying in parallel radial planes of said cylindrical tube, said first arcuate boundary connecting one end of said first straight boundary to one end of said second straight boundary, and said second arcuate boundary connecting the other end of said first straight boundary to the other end of said second straight boundary, said first straight boundaries being separated by a first distance less than said predetermined distance; and said second straight boundaries being separated by said first distance.

15. The tool as defined in claim 14, wherein said first and second legs each have a cross-sectional shape which includes at least one right angle, thereby forming a right-angled portion of each leg, said right-angled portions of said first and second legs being in mutual opposition.

16. The tool as defined in claim 13, further comprising first and second guideways for guiding said first and second legs to slide along a linear path from a pre-insertion position to said fully inserted position, said first and second guideways being respectively joined to said tube at positions whereat said first and second guideways respectively oppose said first and second slots.

17. The tool as defined in claim 16, further comprising first and second spring plungers respectively incorporated in said first and second guideways, said first and second legs of said U-shaped member having respective indentations placed so that said first and second spring plungers respectively reside therein when said U-shaped member is in said fully inserted position.

18. The tool as defined in claim 13, further comprising means for tethering said U-shaped member to said rigid support assembly.

19. The tool as defined in claim 13, wherein said tube comprises stainless steel wrapped with a high-density material for absorbing particles emitted from radioactive material.

20. The tool as defined in claim 19, wherein said high-density material is lead.

* * * * *